(12) United States Patent
Mitnick (10) Patent No.: US 7,996,780 B1
(45) Date of Patent: Aug. 9, 2011

(54) BLOCK VISUALIZATION

(75) Inventor: Victor Mitnick, San Carlos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 451 days.

(21) Appl. No.: 11/140,582

(22) Filed: May 27, 2005

(51) Int. Cl.
*G06F 3/00* (2006.01)

(52) U.S. Cl. ......... 715/762; 715/760; 715/761; 715/763

(58) Field of Classification Search .................. 715/726, 715/517, 520, 521, 528, 529, 762, 769, 760–761, 715/764

See application file for complete search history.

(56) References Cited

U.S. PATENT DOCUMENTS

| | | | | |
|---|---|---|---|---|
| 4,872,167 A * | 10/1989 | Maezawa et al. | ............... | 714/38 |
| 5,204,947 A * | 4/1993 | Bernstein et al. | ............. | 715/854 |
| 5,734,915 A * | 3/1998 | Roewer | ......................... | 715/202 |
| 5,784,056 A * | 7/1998 | Nielsen | .......................... | 715/856 |
| 6,313,835 B1 * | 11/2001 | Gever et al. | ................... | 715/846 |
| 6,321,370 B1 * | 11/2001 | Suzuki et al. | .................. | 716/122 |
| 6,332,212 B1 * | 12/2001 | Organ et al. | ................... | 717/128 |
| 6,546,397 B1 * | 4/2003 | Rempell | ....................... | 707/102 |
| 6,546,543 B1 * | 4/2003 | Manabe et al. | ................ | 716/52 |
| 6,601,057 B1 * | 7/2003 | Underwood et al. | ............. | 707/1 |
| 6,613,099 B2 * | 9/2003 | Crim | ............................. | 715/210 |
| 6,721,713 B1 * | 4/2004 | Guheen et al. | ................... | 705/1 |
| 6,822,663 B2 * | 11/2004 | Wang et al. | ..................... | 715/854 |
| 6,850,808 B2 * | 2/2005 | Yuen et al. | ....................... | 700/86 |
| 7,054,870 B2 * | 5/2006 | Holbrook | .............................. | 1/1 |
| 7,143,344 B2 * | 11/2006 | Parker et al. | .................. | 715/236 |
| 7,152,207 B1 * | 12/2006 | Underwood et al. | ......... | 715/207 |
| 7,174,031 B2 * | 2/2007 | Rhoads et al. | ................. | 382/107 |
| 7,246,306 B2 * | 7/2007 | Chen et al. | ..................... | 715/205 |
| 2002/0067380 A1 * | 6/2002 | Graham | ......................... | 345/838 |
| 2002/0165881 A1 * | 11/2002 | Shelton | .......................... | 707/526 |
| 2002/0166109 A1 * | 11/2002 | Rittman et al. | .................. | 716/19 |
| 2003/0005159 A1 * | 1/2003 | Kumhyr | .......................... | 709/246 |
| 2003/0120686 A1 * | 6/2003 | Kim et al. | ...................... | 707/200 |
| 2003/0210267 A1 * | 11/2003 | Kylberg et al. | ............... | 345/762 |
| 2003/0221162 A1 * | 11/2003 | Sridhar | ....................... | 715/501.1 |
| 2004/0103371 A1 * | 5/2004 | Chen et al. | ..................... | 715/513 |
| 2004/0179213 A1 * | 9/2004 | Oba | ................................ | 358/1.9 |
| 2005/0005266 A1 * | 1/2005 | Datig | ............................. | 717/136 |
| 2005/0050454 A1 * | 3/2005 | Jennery et al. | ................ | 715/513 |
| 2005/0094206 A1 * | 5/2005 | Tonisson | ...................... | 358/1.18 |
| 2005/0138559 A1 * | 6/2005 | Santos-Gomez et al. | ..... | 715/709 |
| 2005/0188322 A1 * | 8/2005 | Napoleon | ...................... | 715/760 |

(Continued)

OTHER PUBLICATIONS

Screen shot Microsoft PowerPoint; ("MS"; Microsoft Corporation; Copyright © 1987-2003.*
2D design (v2), software Tutrials, Falcon et al.; Copyright 1995-2010; 74 pages; http://msc-ks4technology.wikispaces.com/file/view/Techsoft+Tutorials.pdf.*

*Primary Examiner* — Dennis-Doon Chow
*Assistant Examiner* — Linh K Pham
(74) *Attorney, Agent, or Firm* — Kilpatrick Townsend & Stockton LLP (57) ABSTRACT

Block layout features in an interface under design are visually enhanced for a designer. When viewing the interface in a graphical design view of a development environment (DE), the DE adds a fill color for certain layout blocks making up the interface. The color selected for the block is selected to contrast against the colors of any adjacent blocks. The DE may also add visual representations showing the box model parameters of the layout blocks making up the interface. The developer is, therefore, able to see the visual block layout of the interface and also the basic layout of any of the individual blocks.

12 Claims, 10 Drawing Sheets

U.S. PATENT DOCUMENTS

| | | | |
|---|---|---|---|
| 2006/0010374 A1* | 1/2006 | Corrington et al. | 715/517 |
| 2006/0161845 A1* | 7/2006 | Kahn et al. | 715/700 |
| 2006/0236231 A1* | 10/2006 | Allen et al. | 715/517 |
| 2009/0262130 A1* | 10/2009 | Ramirez | 345/595 |

* cited by examiner

BLOCK VISUALIZATION

TECHNICAL FIELD

The present invention relates, in general, to graphical editing environments and, more specifically, to enhanced visualization of block layouts.

BACKGROUND OF THE INVENTION

Over the last decade, the World Wide Web (WWW) has grown from simple graphics and hyperlinks into rich and complex multimedia sites and presentations. Hypertext Markup Language (HTML) is a tag-based markup language that describes the visible format of data. It was one of the first and remains a widely used computer language used to build Web pages and Websites. Web designers typically use Web development environments that include HTML code view editing, in which the designer may write out the HTML script; and/or graphical design view editing, in which the development environment displays the graphical rendering of the HTML as it will appear in a Web browser and allows the designer to graphically manipulate the Web page under design. Using visual editing typically allows the designer to produce a more-refined and visually pleasing result. Web development environments that include such graphical-based editing includes MACROMEDIA INC.'s DREAMWEAVER™, ADOBE SYSTEMS, INC.'s GO LIVE™, MICROSOFT CORPORATION's FRONTPAGE™, and the like. Some Web editing environments, such as DREAMWEAVER™, include both graphical-based and text-based editing views that may be simultaneously displayed to the user and automatically show changes to the other view as a user makes edits in the opposite view.

As technology has advanced, there has been a growth in the use and development of rich Internet applications (RIAs), which are generally Internet-based interactive multimedia applications that operate more-complex logic on the accessing client computer. Many RIA use an interactive multimedia application environment (iMAE), such as MACROMEDIA INC.'s FLASH™ or the like, as the platform to develop the RIA that will be executed using an interactive multimedia runtime container (iMRC), such as MACROMEDIA INC.'s FLASH PLAYER™, running on the accessing client. Application development environments (ADE) have been developed specifically for RIA applications. For example, MACROMEDIA INC.'s FLEX™ server and FLEX BUILDER™ integrated development environment (IDE), are used to design and develop RIA that result in small web file (SWF) formatted files that are natively run using the FLASH PLAYER™.

In both Web pages and RIA, the visual interface is an integral part of the presentation of the information and the user experience. Therefore, the design of the interface is an important part of the overall design of the Web page and/or RIA interface. Graphical interfaces are usually developed by segregating the display canvas into a series of layout blocks or divisions. These blocks are defined in layout elements, such as tables, lists, divisions (DIV), and the like, in HTML, and other block elements, such as HBoxes, VBoxes, and the like in RIA, such as those designed in FLEX BUILDER™. Layout blocks may be nested or imbedded into other layout blocks in order to create a specific design of the interface. As a part of the design process, designers and developers benefit by easily viewing the basic block layout of the interface. However, current ADEs generally provide only an outline of the various layout blocks on the design view canvas. These outlines, while instructive of the division of the interface, do not give the designer much information concerning how the layout blocks are actually set up. For example, the grid of outlines does not give the designer any information on whether the layout blocks are nested or adjacent or imbedded, or the like, or whether the divisions are part of the same block or are, themselves, a different block or blocks. Moreover, within each block, the current outlining features do not instruct the designers about the size or appearance of key parameters, such as the box model parameters supporting the margin, border, padding areas, and the like. Thus, the designer is not able to easily see how the interface is laid out.

BRIEF SUMMARY OF THE INVENTION

The present invention is directed to a system and method that provides an enhanced visualization of the block layout of an electronic graphical interface. In application, on viewing the interface in a design view of an application development environment (ADE), the ADE renders outlines of each block defined on the interface canvas and adds a fill color for each outlined block. The color selected for filling the block is selected to contrast against any adjacent colors of adjacent blocks. The developer is, therefore, able to easily visualize the block layout of the interface.

The ADE also adds visual representations showing the box model parameters of the blocks making up the interface. The box model parameters of any block or container are the standard parameters that define the basic form of the "box" of the block. These parameters include block height, width, outline, border, margin, and padding. Thus, the developer is not only able to more easily see the visual block layout of the interface, he or she is also able to more easily see the basic layout of any of the individual blocks, whether the block is nested or independent.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
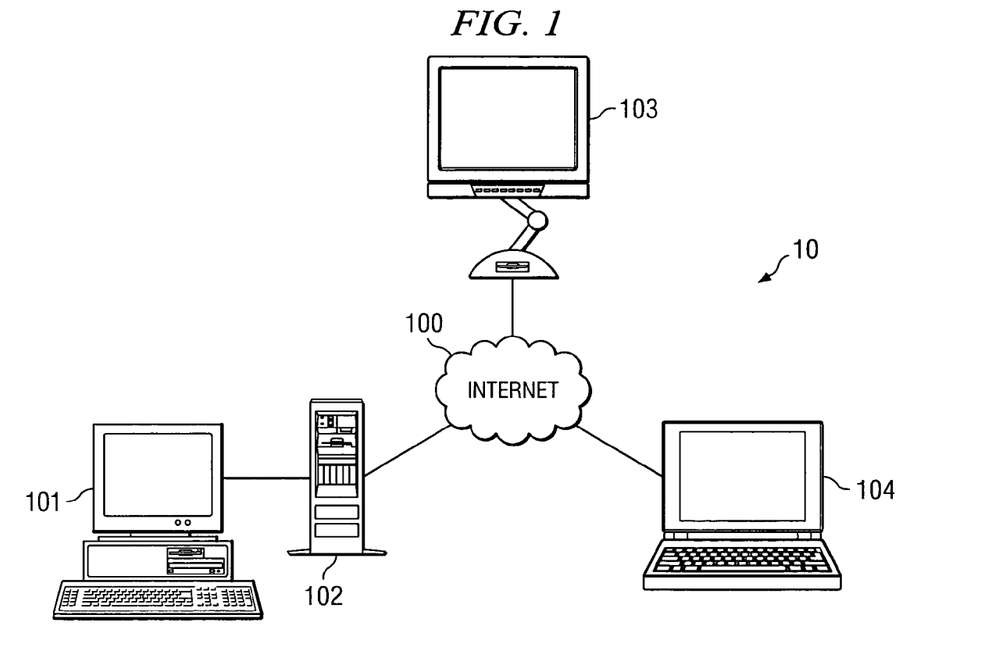
FIG. 1 is a block diagram illustrating distributed design system.

FIG. 1 is a block diagram illustrating distributed design system 10. In typical graphical design of interfaces, whether those interfaces are Web pages or a user interface for some kind of application, a developer or designer designs the interface using development tools running on computer 101. When complete, the interface, along with any associated files are published to server 102. Server 102 may be a Web server for Web or HTML pages, an application server for serving an interactive application to a user, or the like. Users 103 and 104 may access the interface, Web page, application, or the like on server 102 through Internet 100. Server 102 transmits the graphical interface to users 103 and 104 which will then be rendered for viewing by users 103 and 104.

Figure 2A:
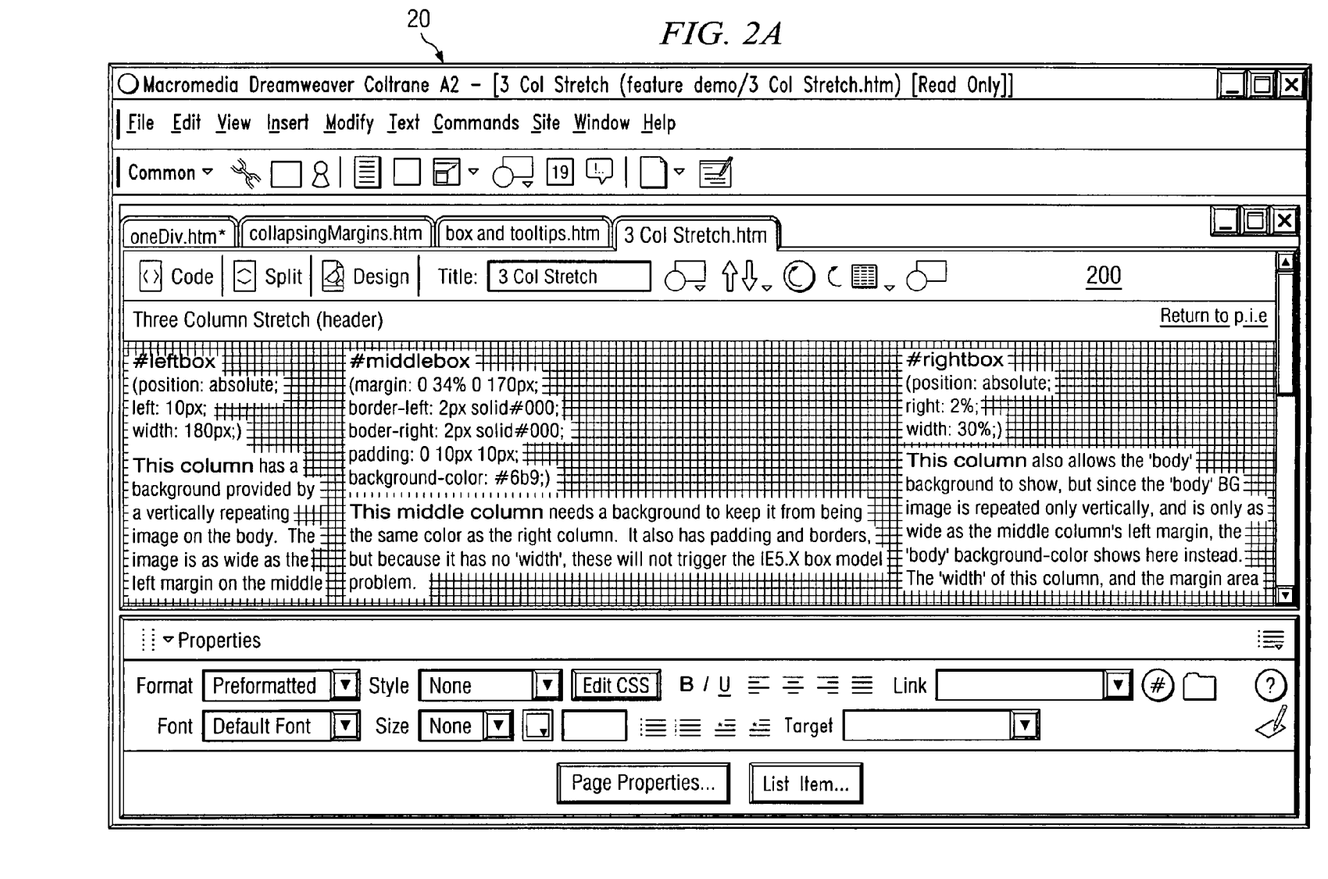
FIG. 2A is a screen shot illustrating a development environment configured according to one embodiment of the present invention wherein the block visualization feature has been deactivated.

FIG. 2A is a screen shot illustrating development environment 20 configured according to one embodiment of the present invention wherein the block visualization feature has been deactivated. Development environment 20 provides a visual canvas for the development of interface 200. Development environment 20 may be any various type of graphically-enabled development environment, such as DREAMWEAVER™, FLEX BUILDER™, FLASH™, MICROSOFT CORPORATION's VISUALSTUDIO-.NET™, FRONT PAGE™, GO LIVE™, BORLAND SOFTWARE CORPORATION's DELPHI™, and the like. Interface 200 depicts a series of text paragraphs. A developer would determine the layout and content of interface 200 using development environment 20. As illustrated in FIG. 2A, the entire interface 200 appears to be a seamless collection of paragraphs.

Figure 2B:
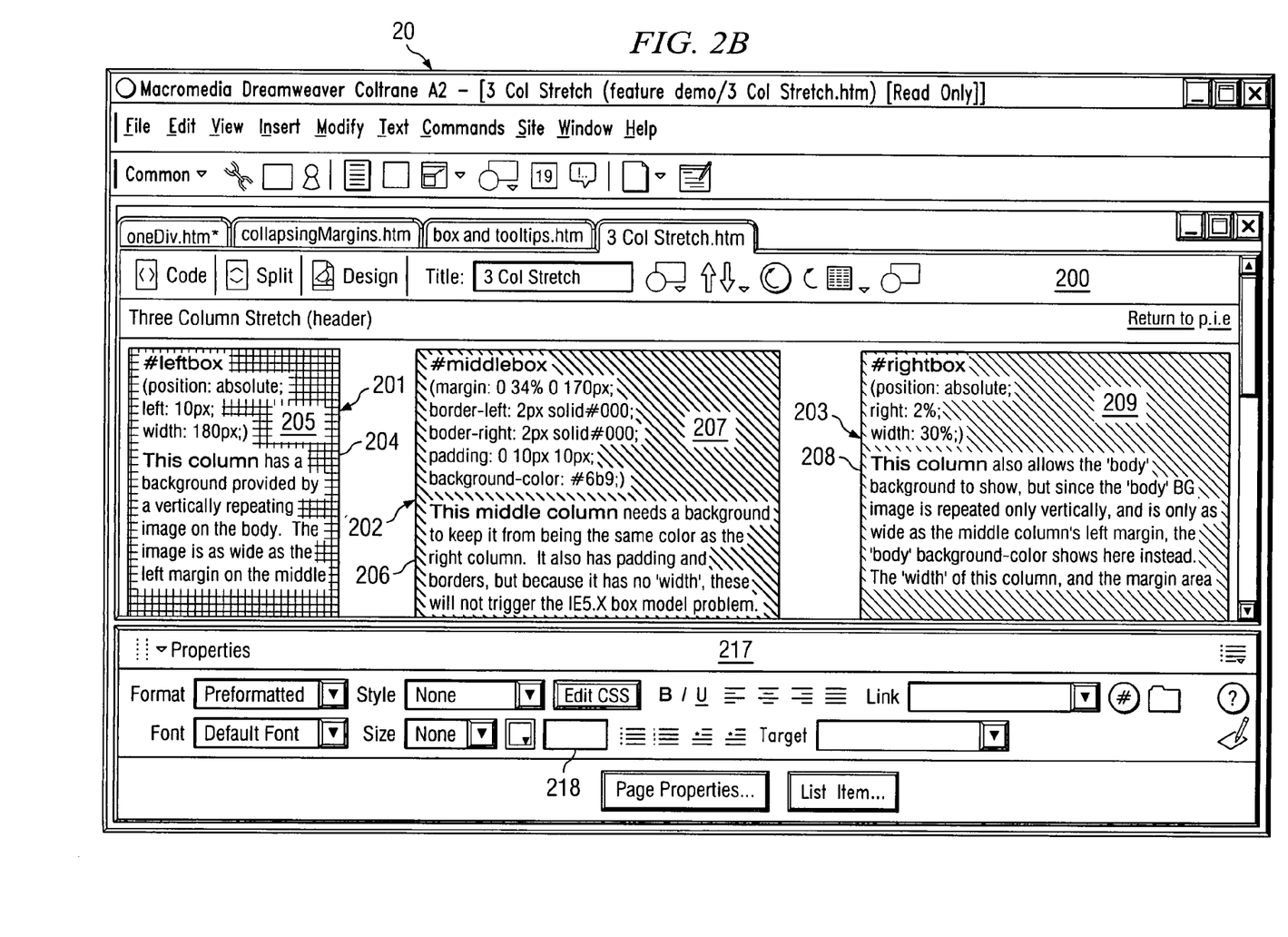
FIG. 2B is a screen shot illustrating a development environment configured according to one embodiment of the present invention wherein the block visualization feature has been activated.

FIG. 2B is a screen shot illustrating development environment 20 configured according to one embodiment of the present invention wherein the block visualization feature has been activated. When activated, the block visualization feature of the illustrated embodiment provides visual indication to the developer of the block layout of interface 200. Upon viewing of interface 200, a developer may easily see that it is divided into three main blocks, blocks 201-203. Development environment 20 renders outlines 204, 206, and 208 around blocks 201-203, respectively to provide a visual border for each of the blocks. Furthermore, development environment 20 includes colors 205, 207, and 209 in order to visually distinguish each of blocks 201-203.

It should be noted that colors 205, 207, and 209 are selected to provide visual contrast between adjacent or consecutive blocks. While any underlying color selection algorithm that might be used by development environment 20 would not need to preclude reusing colors, colors are selected in an attempt to provide good visual differentiations.

Figure 2C:
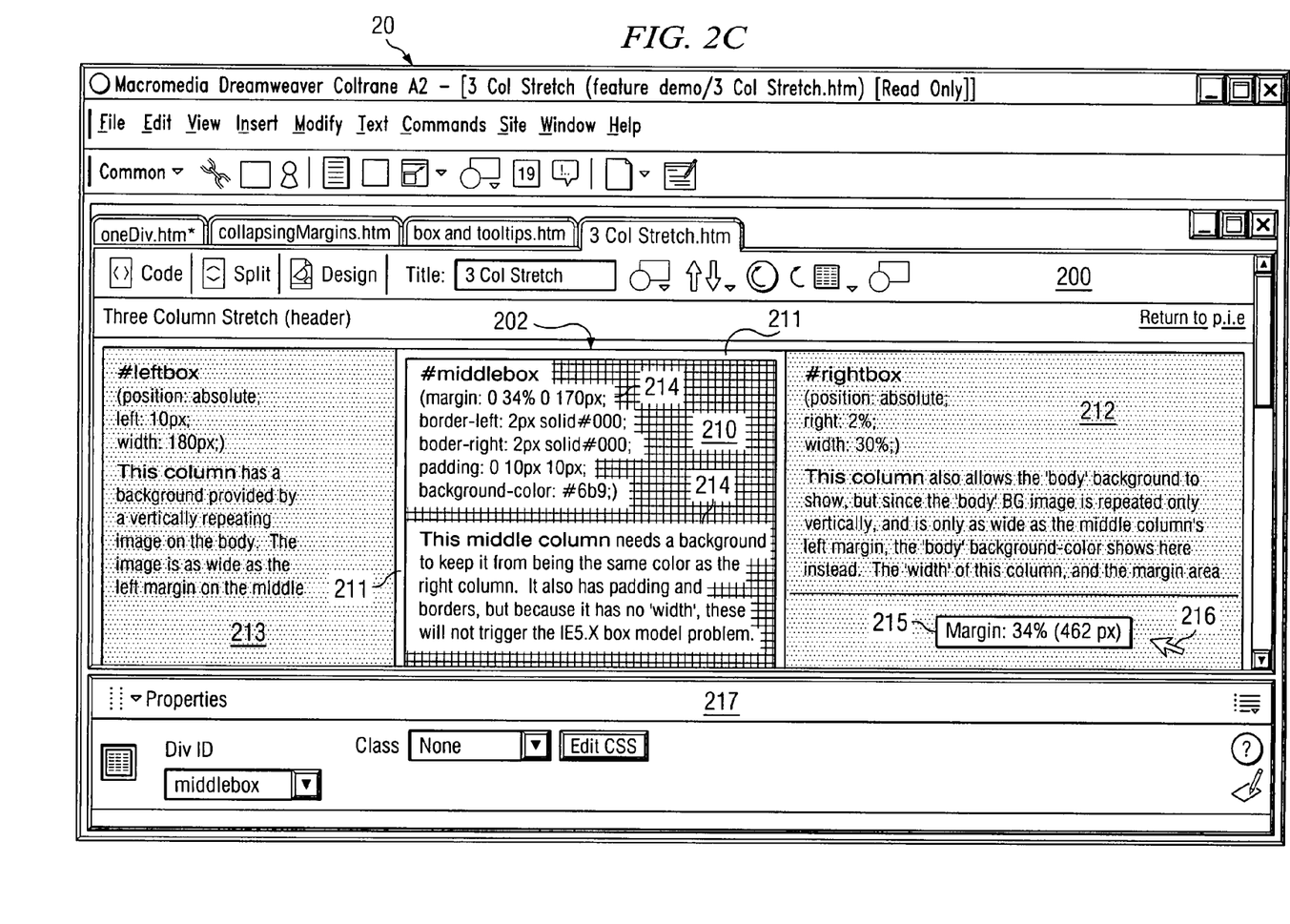
FIG. 2C is a screen shot illustrating a development environment configured according to one embodiment of the present invention wherein box model parameters are visually represented.

FIG. 2C is a screen shot illustrating development environment 20 configured according to one embodiment of the present invention wherein box model parameters are visually represented. As the developer, using development environment 20, selects block 202, development environment 20 visually displays the box parameters for block 202. The box parameters for block 202 comprise border 210, padding 211, right margin 212, and left margin 213. Block 202 may also have a top and bottom margin; however, they are not currently visible on the canvas display window of development environment 20, as shown in FIG. 2C.

In the example depicted in FIG. 2C, development environment 20 also shows paragraph blocks 214. It should be noted that in additional and/or alternative embodiments of the present invention, other development environments may not display visual blocks for paragraph-style layouts.

It should be noted that while FIG. 2C illustrates a differentiation between margins 212 and 213 and padding 211 by using different styles of cross-hatching, any other suitable means for illustrating a visual contrast may be used, such as different colors (as is used to differentiate between the blocks in the layout), different shades of the same color, or the like.

While providing visual indication of the various box model parameters assists the developer or designer in creating the interface, it may also be helpful to provide the actual parameter values. One method of providing such information is displayed in tool-tip 215. As the designer hovers cursor 216 over right margin 212, tool-tip 215 pops up with the parameter information on right margin 212. In the example, tool-tip 215 states that right margin 212 has a margin of 34% or 462 pixels. This information may be important to the designer in modifying the sizes of any of the margins, padding, or the like.

It should be noted that in additional and/or alternative embodiments of the present invention, the box model parameters may be displayed in various manners. For example, all box model visualizations may appear for each block displayed on the interface canvas. The designer may selectively choose to turn or toggle such box model displays on or off as desired. An alternative means for displaying the box model visualization would be to display the box model parameters only in the blocks that the user selects. Thus, at the initial screen, only the major blocks are differentiated through the block visualization feature. Once the designer selects one of the blocks, the development environment would render the box model parameters onto the selected box. Any variation of such means may be utilized by the different embodiments of the present invention.

Figure 3:
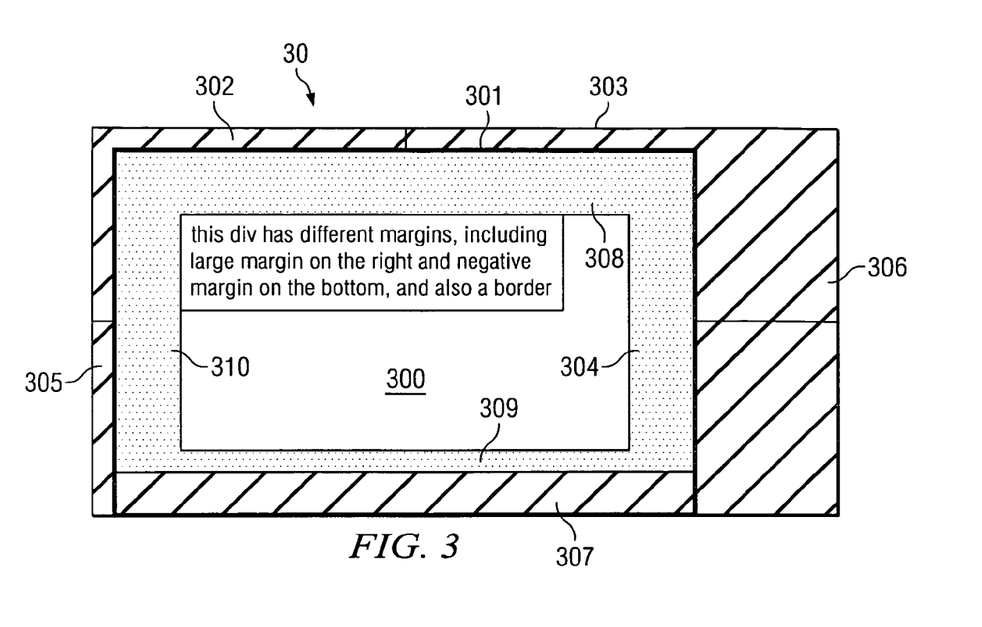
FIG. 3 is a block diagram illustrating a block rendered according to one embodiment of the present invention.

FIG. 3 is a block diagram illustrating block 30 rendered according to one embodiment of the present invention. The various embodiments of the present invention allow for different sized margins, padding, borders, and the like to be displayed on a particular block. Block 30 is surrounded by outline 303 that is rendered using a specific width and line weight. Content region 300, the area in which the content of block 30 may be added, is, itself, surround by border 301, which is rendered using a particular width and line weight that is different than outline 303. Between content region 300 and border 301, padding 304 and 308-310 is rendered. Left padding 310 and right padding 304 appear to be equal in size; however, top padding 308 appears to be larger than bottom padding 309. In fact, top padding 308 may be the same size as bottom padding 309.

Negative parameters may also be illustrated in the block layout visualization of the described embodiment. Margins 302, 305, 306, and 307 generally define the space between border 301 and outline 303. Left margin 305 is much smaller than right margin 306. However, bottom margin 307 is a negative space, which is shown overlapping into bottom padding 309. Therefore, while bottom padding 309 now appears to be smaller than top padding 308, it is being overlapped by bottom margin 307 because of the margin's negative size.

Figure 4:
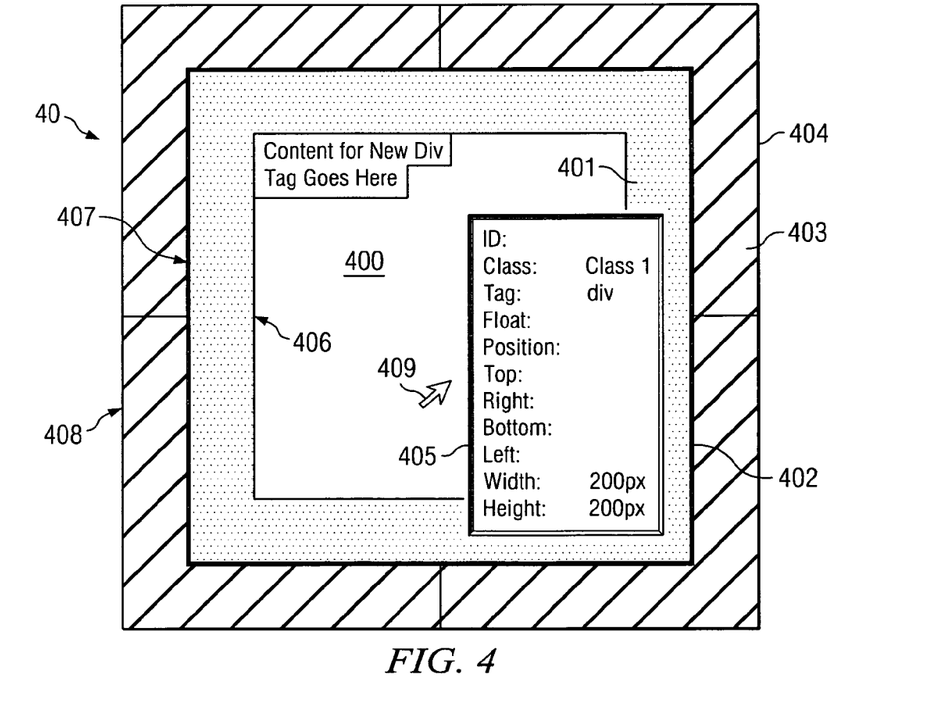
FIG. 4 is a block diagram illustrating a block rendered according to one embodiment of the present invention.

FIG. 4 is a block diagram illustrating block 40 rendered according to one embodiment of the present invention. Block 40 is illustrated with content region 400 surrounded by padding 401, border 402, margin 403, and outline 404. In addition to providing simple tool-tip information in rollover pop-ups, more substantial information may be given in a tool-tip box, such as parameter box 405. In one example of implementation, a user may right click a mouse or pointing device when cursor 409 is over a pre-designated portion of the block, such as content region 400 of block 40. When the right-click is detected, the development environment displays parameter box 405 revealing a set of parameters for block 40.

The block visualization feature may also be useful in editing the values of the parameters making up the block. Instead of requiring a designer to use a property inspector window or a separate operational view, additional and/or alternative embodiments of the present invention allow the designer to graphically manipulate the block by position the cursor at various locations and dragging-and-dropping the parameter edge to the desired location. For example, in FIG. 4, a designer may position cursor 409 at edge 406 of the padding. By dragging-and-dropping the padding edge, edge 406, the actual parameter value for the padding at edge 406 will be changed. Similarly, by positioning cursor 409 at point 407 or edge 408, the designer may modify the actual parameter values of the border and margins, respectively, through dragging-and-dropping the point/edge.

It should be noted that in additional and/or alternative embodiments of the present invention, a separate interface may be provided to the designer to modify the values of the various parameters making up the block. For example, property inspector 217 (FIGS. 2B & 2C) may provide an interface for the designer to manipulate the parameter values as desired.

Figure 5:
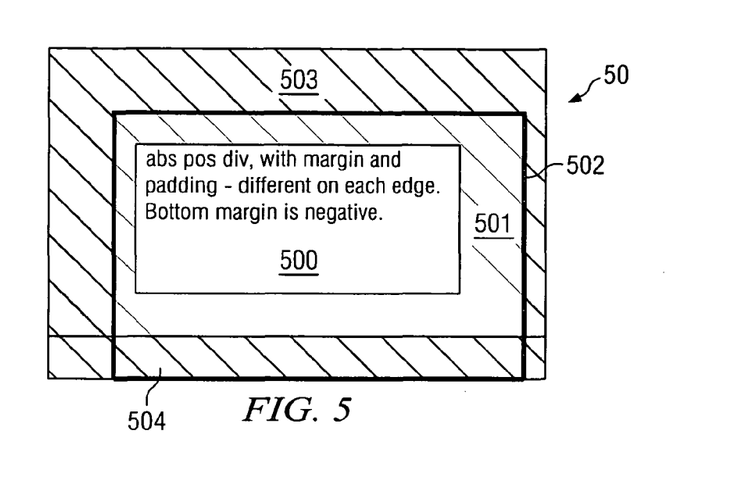
FIG. 5 is a block diagram illustration a block rendered according to one embodiment of the present invention.

FIG. 5 is a block diagram illustration block 50 rendered according to one embodiment of the present invention. Block 50 is rendered by a development environment that utilizes a combination of different colors and hatching to differentiate between the visual parameters. For example, content region 500 is surrounded by padding 501, which is represented in a first color. Border 502 is represented by a second color, while margin 503 is represented by still another color. Because the bottom margin is negative and overlaps onto padding 501, cross-hatching is used for overlap region 504 to illustrate that such an overlap has occurred. Therefore, by viewing block 50, the designer is able to easily detect the layout and structure of block 50.

It should be noted that in additional and/or alternative embodiments of the present invention, a designer may customize the types of blocks to be included in the block visualization feature along with the specific colors or number of colors to use in implementing the feature. For example, while, in HTML, a paragraph tag defines a block of text, it may not be desirable to automatically include all paragraphs as separately identified blocks in the block visualization features. The typical large number of paragraphs may, therefore, clutter the edit interface for the designer. However, a designer may determine that he or she wants to block off paragraphs. In such instances, the customizing interface would allow the designer to designate paragraph structures for block visualizing.

Figure 6A:
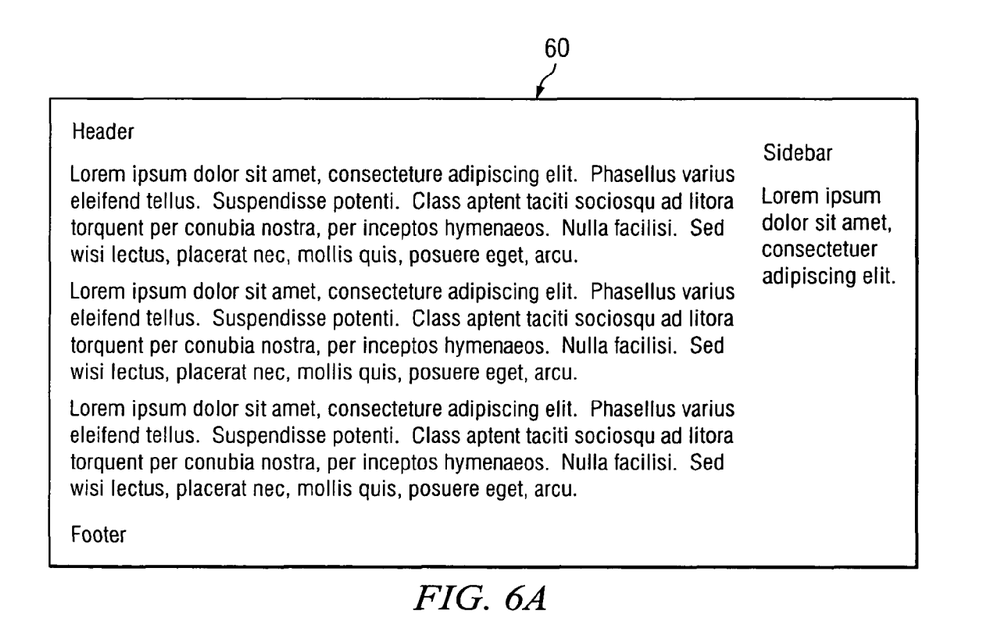
FIG. 6A is a diagram illustrating a Web page.
Figure 6B:
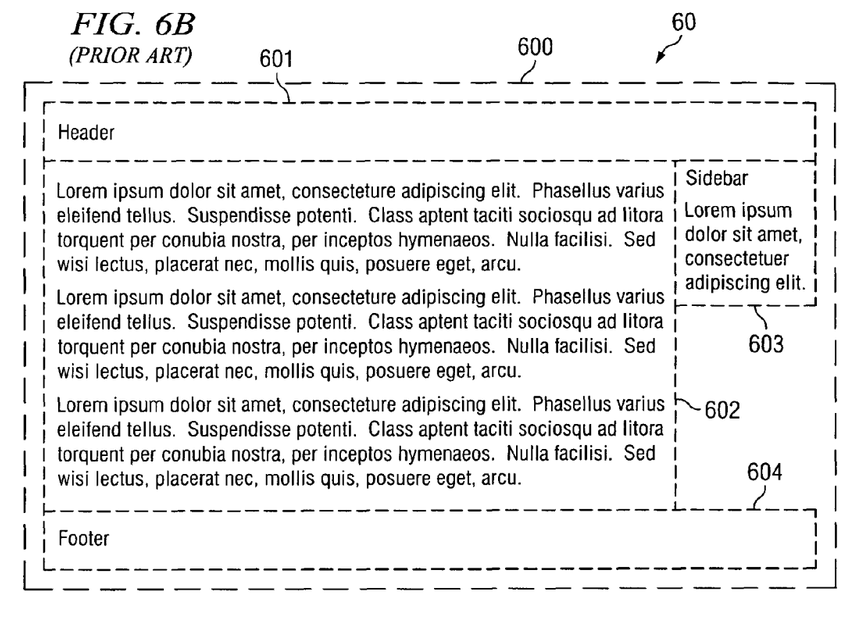
FIG. 6B is a diagram illustrating the Web page of FIG. 6A displayed in a typical development environment.

FIG. 6A is a diagram illustrating Web page 60. When displayed on a typical Web browser, Web page 60 appears as a collection of paragraphs of text. However, underlying the simple layout, there may be a much more complex layout structure. In existing development environments, features exist that will supply an outline around the constructs, containers, and blocks. FIG. 6B is a diagram illustrating such an existing feature. The development environment used with regard to FIG. 6B provides outlines around blocks 600-604. The structure of Web page 60 includes several nested or embedded containers. However, this nested structure is not evident from the visual aids provided and shown in FIG. 6B.

Figure 6C:
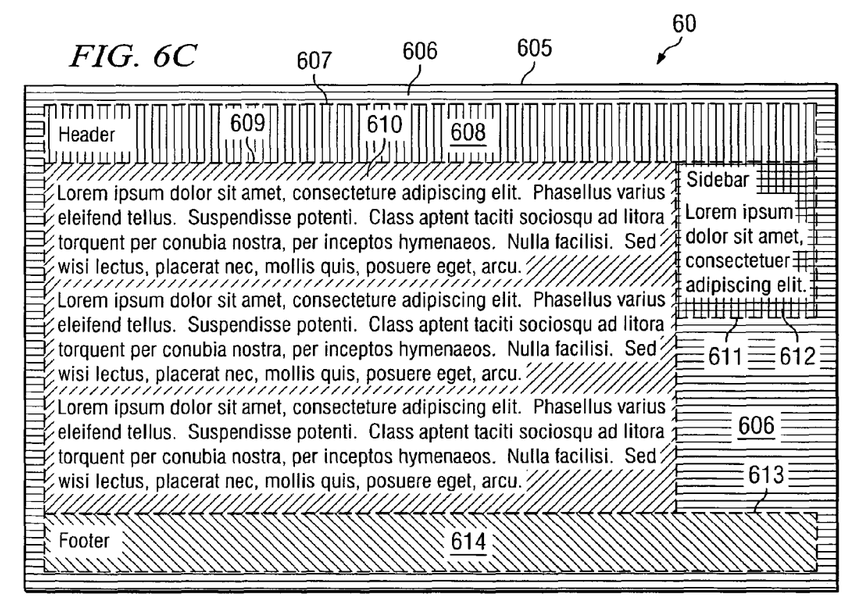
FIG. 6C is a diagram illustrating the Web page of FIG. 6A displayed in a development environment configured according to one embodiment of the present invention.

FIG. 6C is a diagram illustrating Web page 60 displayed in a development environment configured according to one embodiment of the present invention. As the development environment displays Web page 60, the block visualization feature provides visual differentiation between the containers making up Web page 60. The main container is outlined by outline 605 and is colored with color 606. A nested header container is outlined by outline 607 and assigned color 608 to differentiate from color 606, color 610 of the content container, and color 612 of the sidebar container. The content container is outlined by outline 609 and the sidebar container is outlined by outline 611. The footer container is outlined with outline 613 and given color 614. Color 614 is selected also to contrast with adjacent colors 610 and 606. By using this feature, a designer may easily discern the structure of Web page 60 by viewing the differentiated containers.

Figure 6D:
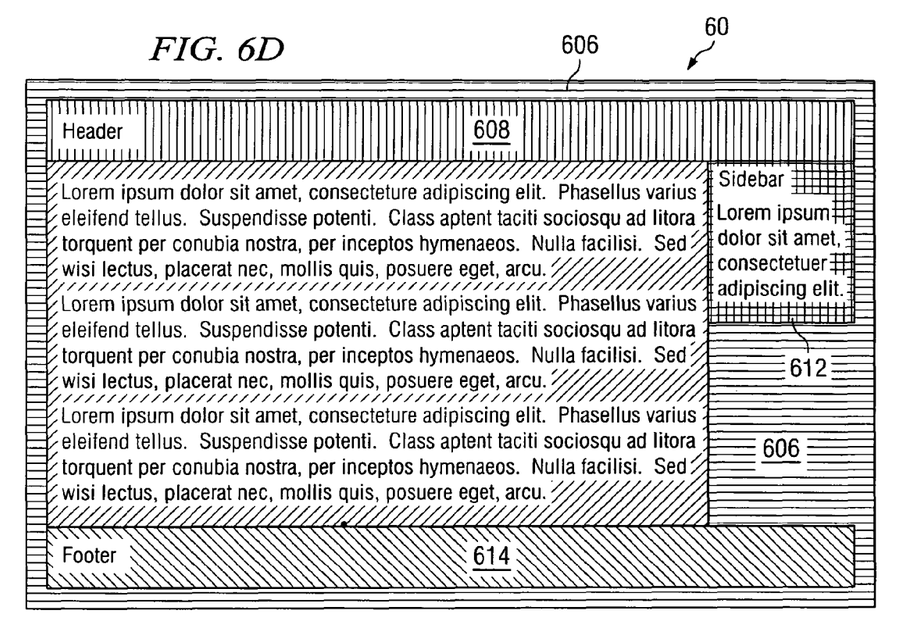
FIG. 6D is a diagram illustrating the Web page of FIG. 6A displayed in a development environment configured according to another embodiment of the present invention.

FIG. 6D is a diagram illustrating Web page 60 displayed in a development environment configured according to another embodiment of the present invention. Instead of providing both colors and outlines to segregate the various containers making up Web page 60, the development environment displaying Web page 60 in FIG. 6D differentiates the containers using only colors 606, 608, 612, and 614. The designer is still able to easily view the structure of Web page 60 simply by viewing the block coloring of the containers.

Figure 7:
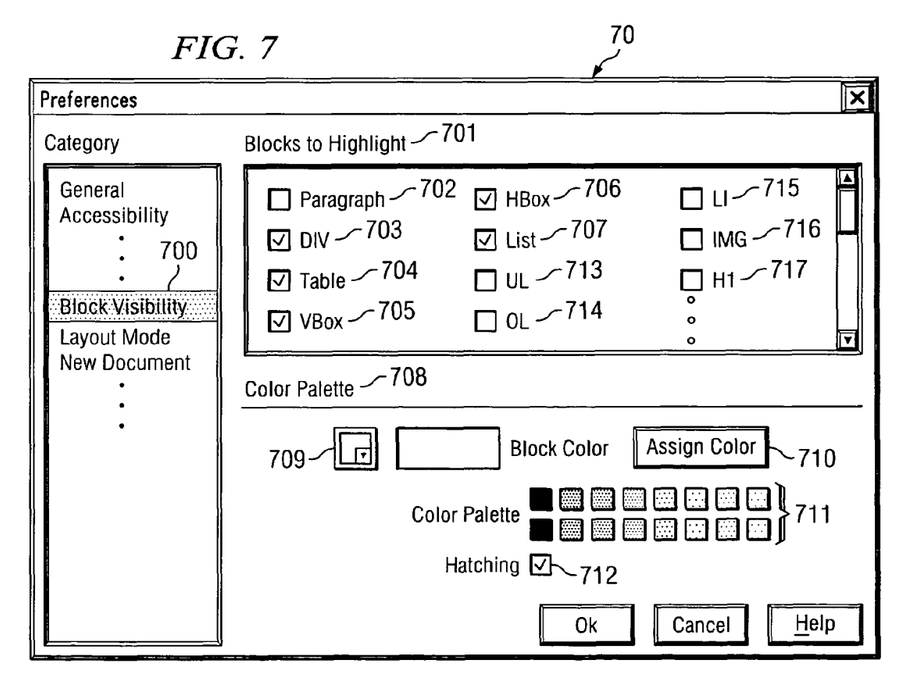
FIG. 7 is a diagram illustrating a preference panel displayed in a development environment configured according to the present invention.

FIG. 7 is a diagram illustrating preference panel 70 displayed in a development environment configured according to the present invention. In the embodiment of the present invention depicted in FIG. 7, the development environment provides a way for the designer to customize the implementation of the block visualization feature. When the designer wishes to modify the feature performance, preference panel 70 is provided. The designer may select block visibility category 700 to reveal the variable parameter of the feature.

Blocks to Highlight section 701 provides a list of check boxes for the designer to designate which block formats to set off visibly from others. The designer has selected to highlight DIV 703, Table 704, VBox 705, HBox 706, and List 707, but to leave Paragraph 702 un-highlighted.

It should be noted that the layout elements listed in FIG. 7 are intended only for example and do not limit implementation of the various embodiments of the present invention to any certain number of layout elements or types.

Color Palette 708 also allows the designer to select the color set that will be used to highlight the various blocks. The designer can search for the desired color through color well 709 and use Assign Color button 710 to place the selected color into the color set. Current Color Palette 711 displays the color swatches for each of the colors that are currently in the set of colors for use in the feature. Hatching check box 712 allows the user to determine whether the system also uses hatching in visually rendering the layout elements.

It should be noted that in additional and/or alternative embodiments of the present invention, the development environment may limit the total number of colors in the color set to a specific number. Depending on the memory resources that the development environment desires to affect, it may limit the feature to 4, 8, 10, 16, 32, or any other such number of colors.

In general operation of selected embodiments of the present invention, the development environment reads the code, tags, or other metadata that describes the structural or stylistic layout of the interface. Certain such structures and formats have been pre-coded into the development environment for display in the block visualization feature. For example, while a paragraph tag in HTML represents a structural block, the development environment may not include paragraph tags for enhanced display. DIV constructs, however, also represent block layout elements and may be included in the enhancement feature. Any number of different combinations of block layout elements may be pre-coded into the development environment for enhanced display.

Various embodiments of the present invention may also be used in conjunction with style sheets to provide a level of customization to designers. Using CSS, developers are typically able to separate the style of a Web document from its structure and content. Thus, developers are generally able to define the style of an entire Web document by defining styles and applying those styles to the content and structure of the document. Because the style is applied to the content, one style may be applied to multiple sections of the document, reducing the size of the resulting Web page. Moreover, developers may change the entire appearance of a Web page by changing the CSS without effecting the content of the page.

CSS uses rules to define how a document should appear. These rules may be included within the same Web document, whether in a single location (such as the HTML <head> element) or inline with the element to be changed or in a separate, linked style document. A style may also be defined by name and then, subsequently, be applied to a particular element using a spanning tag around that element that calls and/or identifies the named style. A CSS rule typically includes a selector portion that defines to which elements or classes a rule will be applied, and a declaration that indicates the particular properties of an element that is to be changed, such as its typeface, font, color, and the like, and a value for the change to the particular property. One of the powerful features of CSS is that many of the properties that have been applied to a particular element may be inherited by child elements. If a more-specific rule is placed within the document, the more-specific rule will usually override any of the properties associated with the general rule. Therefore, the rules may cascade through the document.

Selected embodiments of the present invention may leverage CSS to assist in determining which layout elements to include in the enhanced visualization. The development environments configured according to such embodiments may read the CSS rules to determine whether or not the particular style/format of the interface element should enhanced visually. The designer may, therefore, use CSS rules to force certain objects to be enhanced where they might not ordinarily be pre-coded for enhancement or may use CSS rules to prevent a typically enhanced block from being enhanced. For example, one development environment configured according to one embodiment of the present invention may not automatically enhance paragraph blocks. However, in this example, the designer would like to enhance certain paragraph blocks. The designer may include CSS rules that describe these certain paragraph blocks as blocks to be enhanced. Similarly, by writing CSS rules to designate enhanced blocks to be left alone, the designer may prevent the enhancement from being applied. Thus, using CSS rules, the designer may create a customized performance for the enhanced visualization of the various layout blocks.

Figure 8:
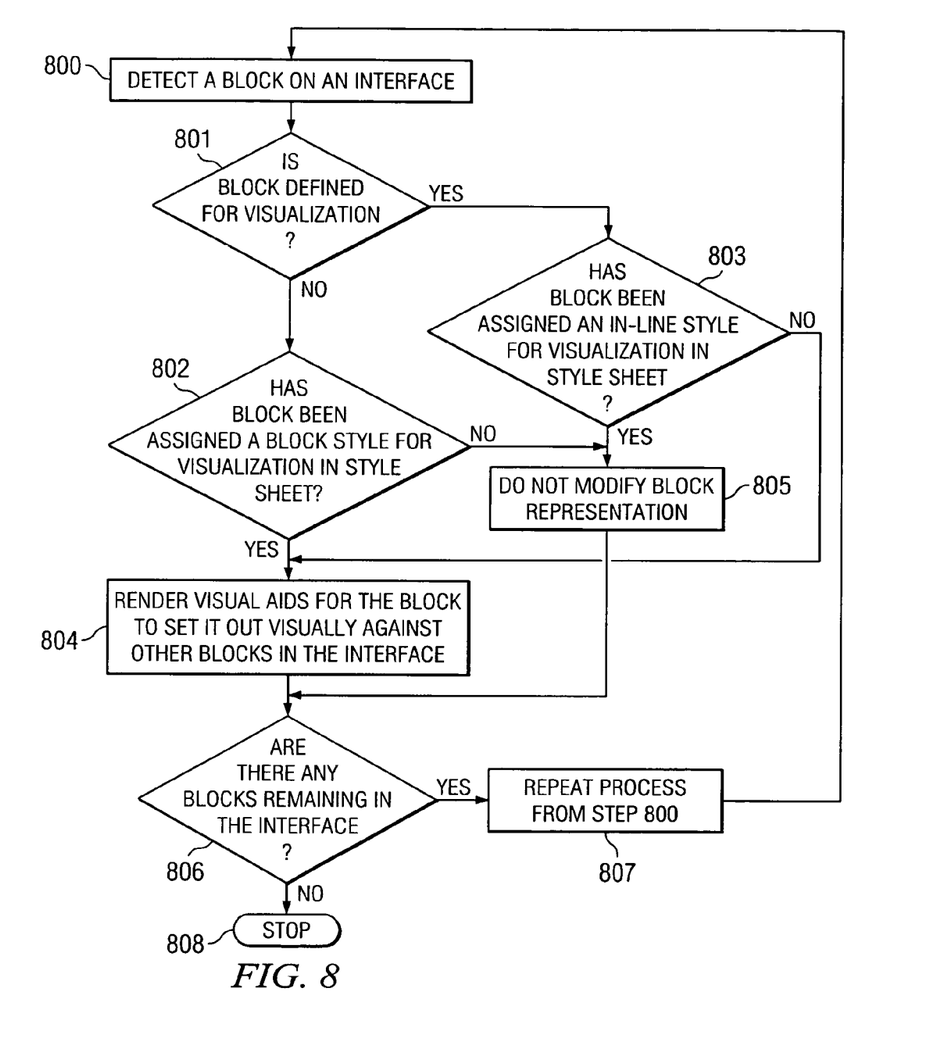
FIG. 8 is a flow chart illustrating example steps executed in implementing one embodiment of the present invention.

FIG. 8 is a flowchart illustrating example steps performed in executing one embodiment of the present invention. In step 800, a block is detected on an Interface. A determination is made, in step 801, whether the block is one that is automatically defined for enhanced visualization. If so, another determination is made, in step 803, whether the block has been assigned an in-line/non-enhanced style in style sheet code. If a block is determined not to be automatically defined for enhanced visualization in step 801, another determination is made, in step 802, whether the block has been assigned an enhanced style in style sheet code. If so, then the enhanced visual aids are rendered for the block, in step 804. Step 804 is also executed after a negative response to the determination of step 803. If, in response to step 803, a block has been assigned an in-line/non-enhanced style, the block will not be modified 805. The block would also not be modified, in step 805, if there is a negative response to the determination of step 802. In step 806, a determination is made whether there any blocks remaining in the interface. If so, then, in step 807, the process is repeated from Step 800. Otherwise, the process stops in step 808.

Figure 9:
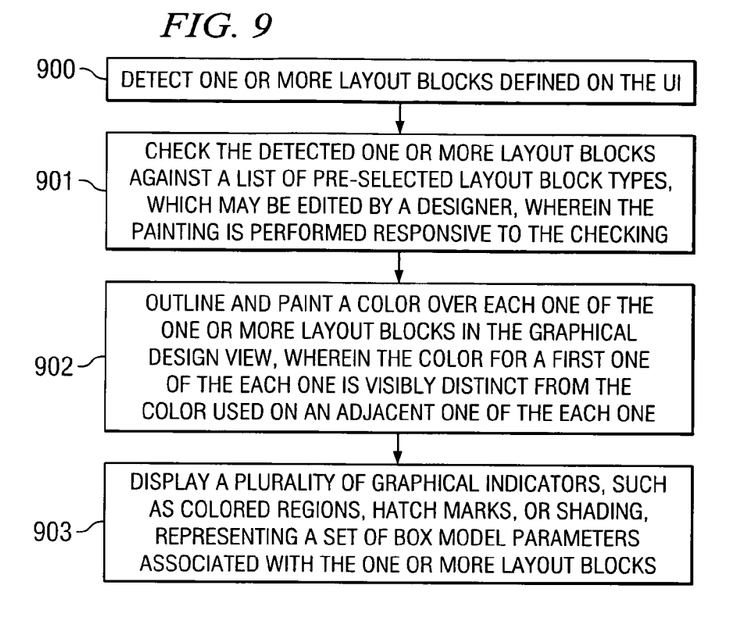
FIG. 9 is a flowchart illustrating example steps executed in implementing one embodiment of the present invention.

FIG. 9 is a flowchart illustrating example steps executed in implementing one embodiment of the present invention. In step 900, one or more layout blocks defined on the UI are detected. The detected layout blocks are checked, in step 901, against a list of pre-selected layout block types, which may be edited by a designer, wherein the painting is performed responsive to the checking. Responsive to the checking in step 901, a color is painted and an outline is drawn in step 902 over each of the layout blocks in the graphical design view, wherein the color for a first one of the layout blocks is visibly distinct from the color used on adjacent blocks. In step 903, a plurality of graphical indicators, such as colored regions, hatch marks, or shading, are displayed representing a set of box model parameters associated with the layout blocks.

The program or code segments making up the various embodiments of the present invention may be stored in a computer readable medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The code segments may be downloaded via computer networks such as the Internet, Intranet, and the like.

Figure 10:
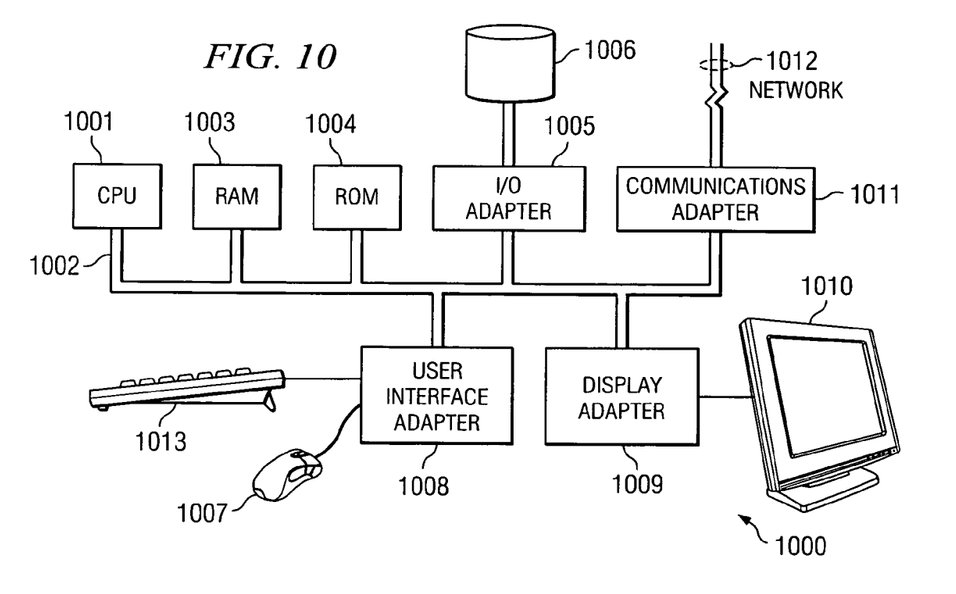
FIG. 10 illustrates a computer system adapted to use embodiments of the present invention

FIG. 10 illustrates computer system 1000 adapted to use embodiments of the present invention, e.g. storing and/or executing software associated with the embodiments. Central processing unit (CPU) 1001 is coupled to system bus 1002. The CPU 1001 may be any general purpose CPU. However, embodiments of the present invention are not restricted by the architecture of CPU 1001 as long as CPU 1001 supports the inventive operations as described herein. Bus 1002 is coupled to random access memory (RAM) 1003, which may be SRAM, DRAM, or SDRAM. ROM 1004 is also coupled to bus 1002, which may be PROM, EPROM, or EEPROM. RAM 1003 and ROM 1004 hold user and system data and programs as is well known in the art.

Bus 1002 is also coupled to input/output (I/O) controller card 1005, communications adapter card 1011, user interface card 1008, and display card 1009. The I/O adapter card 1005 connects storage devices 1006, such as one or more of a hard drive, a CD drive, a floppy disk drive, a tape drive, to computer system 1000. The I/O adapter 1005 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 1011 is adapted to couple the computer system 1000 to a network 1012, which may be one or more of a telephone network, a local (LAN) and/or a wide-area (WAN) network, an Ethernet network, and/or the Internet network. User interface card 1008 couples user input devices, such as keyboard 1013, pointing device 1007, and the like, to the computer system 1000. The display card 1009 is driven by CPU 1001 to control the display on display device 1010.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method for designing a user interface (UI) in a graphical design view, said method comprising:
   detecting, by a application development environment providing the graphical design view, one or more layout blocks defined on said UI;
   checking the layout blocks against a list of pre-selected block types;
   in response to detecting and checking, automatically painting a color over each one of said one or more layout blocks in said graphical design view if a block visualization feature is activated, the color of each block selected so that adjacent areas have different colors, and the colors are not displayed if the block visualization feature is not activated;
   displaying, in the graphical design view, a plurality of graphical indicators representing a set of box model parameters associated with at least one of the layout blocks, the box model parameters comprising at least one of a padding or margin of the layout block; and
   providing an option to toggle one or more of the plurality of graphical indicators on or off, wherein toggling the one or more of the plurality of graphical indicators off removes the toggled one or more graphical indicators from the graphical design view,
   wherein the plurality of graphical indicators each comprise at least one of:
   a colored region displayed on one or more areas of the layout block, the one or more areas corresponding to a location of the set of box model parameters and the colored region being a different color than the color of the layout block;
   hatch marks rendered onto the one or more areas of the layout block; or
   a shaded region drawn onto the one or more areas of the layout block.

2. The computer implemented method of claim 1 further comprising:
   outlining each of said one or more layout blocks.

3. The computer implemented method of claim 1, wherein said list of pre-selected layout block types is editable by a designer.

4. The computer implemented method of claim 1, wherein said plurality of graphical indicators are displayed on the layout block responsive to input selecting the block after the layout blocks have been painted.

5. A computer program product having a tangible computer readable medium with computer program logic recorded thereon for designing a user interface (UI) in a graphical design view, said computer program logic comprising:
   code for detecting, by an application development environment providing the graphical design view, one or more layout blocks defined on said UI;
   code for checking the layout blocks against a list of pre-selected block types;
   code for automatically painting a color over each one of said one or more layout blocks in said graphical design view in response to detecting and checking, automatically painting occurring only if a block visualization feature is activated, a color used for each block so that adjacent blocks have different colors, and the colors are not displayed if the block visualization feature is not activated;
   code for displaying, in the graphical design view, a plurality of graphical indicators representing a set of box model parameters associated with at least one of the layout blocks, the box model parameters comprising at least one of a padding or margin of the layout block; and
   code for providing an option to toggle one or more of the plurality of graphical indicators on or off, wherein toggling the one or more of the graphical indicators off removes the one or more of the graphical indicators that have been toggled off from the graphical design view,
   wherein the plurality of graphical indicators each comprise at least one of:
   a colored region displayed on one or more areas of the layout block, the one or more areas corresponding to a location of the set of box model parameters and the colored region being a different color than the color of the layout block;

hatch marks rendered onto the one or more areas of the layout block; or a shaded region drawn onto the one or more areas of the layout block.

6. The computer program product set forth in claim 5, further comprising code for outlining each of said one or more layout blocks.

7. The computer program product set forth in claim 5, wherein said list of pre-selected layout block types is editable by a designer.

8. The computer program product set forth in claim 5, wherein the code for displaying the plurality of graphical indicators is configured to display the graphical indicators on the layout block responsive to input selecting the block after the layout blocks have been painted.

9. A computing system comprising a processor with access to a computer-readable medium tangibly embodying program components that configure the computing system to perform actions comprising:

providing an application development environment with a graphical design view, the graphical design view configured to allow design of a user interface;

detecting, by the application development environment, one or more layout blocks defined in the user interface;

checking the layout blocks against a list of pre-selected block types;

in response to detecting and checking, automatically painting a color over each one of said one or more layout blocks in said graphical design view, automatically painting occurring only if a block visualization feature is activated, a color used for each block so that adjacent blocks have different colors, and the colors are not displayed if the block visualization feature is not activated;

displaying, in the graphical design view, a plurality of graphical indicators representing a set of box model parameters associated with at least one of the layout blocks, the box model parameters comprising at least one of a padding or margin of the layout block; and providing an option to toggle one or more of the plurality of graphical indicators on or off, wherein toggling the one or more of the plurality of graphical indicators off removes the one or more graphical indicators that have been toggled off from the graphical design view, wherein the plurality of graphical indicators each comprise at least one of:

a colored region displayed on one or more areas of the layout block, the one or more areas corresponding to a location of the set of box model parameters and the colored region being a different color than the color of the layout block;

hatch marks rendered onto the one or more areas of the layout block; or a shaded region drawn onto the one or more areas of the layout block.

10. The computing system set forth in claim 9, wherein the program components configure the computing system to perform actions further comprising:

outlining each of said one or more layout blocks.

11. The computing system set forth in claim 9, wherein the program components configure the computing system to perform actions further comprising:

receiving an edit to the list of pre-selected layout block types.

12. The computing system set forth in claim 9, wherein said plurality of graphical indicators are displayed on the layout block responsive to input selecting the block after the layout blocks have been painted.

* * * * *

UNITED STATES PATENT AND TRADEMARK OFFICE
CERTIFICATE OF CORRECTION

| | | |
|---|---|---|
| PATENT NO. | : 7,996,780 B1 | Page 1 of 1 |
| APPLICATION NO. | : 11/140582 | |
| DATED | : August 9, 2011 | |
| INVENTOR(S) | : Mitnick | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this
Twentieth Day of December, 2011

David J. Kappos
*Director of the United States Patent and Trademark Office*